United States Patent
Spildener et al.

(10) Patent No.: US 6,310,950 B1
(45) Date of Patent: Oct. 30, 2001

(54) METHOD, EXCHANGE AND TELECOMMUNICATIONS NETWORK FOR CONTROLLING THE ESTABLISHMENT OF CONNECTIONS TO A SUBSCRIBER WHO IS THE DESTINATION OF MASS CALLING

(75) Inventors: Kurt Spildener, Stuttgart; Rainer Münch, Markgröningen; Markus Hollas, Meerbusch; Gernot Stratenberg, Gerlingen; Horst Wegner; Rupert Barnsteiner, both of Stuttgart, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/928,187

(22) Filed: Sep. 12, 1997

(30) Foreign Application Priority Data

Sep. 14, 1996 (DE) .............................. 196 37 530

(51) Int. Cl.[7] .................................................. H04M 15/00
(52) U.S. Cl. ........................................ 379/219; 379/220
(58) Field of Search ..................... 379/219, 220, 379/221, 229, 230, 279, 133, 139; 370/229, 408

(56) References Cited

U.S. PATENT DOCUMENTS

| | | | | |
|---|---|---|---|---|
| 5,068,892 | * | 11/1991 | Livanos .............................. | 379/221 |
| 5,295,183 | * | 3/1994 | Langlois et al. ................... | 379/221 |
| 5,450,483 | | 9/1995 | Williams . | |
| 5,459,777 | * | 10/1995 | Bassa et al. ....................... | 379/133 |
| 5,825,861 | * | 10/1998 | Hoy .................................... | 379/134 |
| 5,845,202 | * | 12/1998 | Davis .................................. | 455/412 |
| 5,852,064 | * | 11/1998 | Jeong ................................. | 379/207 |
| 5,898,672 | * | 4/1999 | Ginzboorg ......................... | 370/236 |
| 5,914,936 | * | 6/1999 | Hatono et al. ..................... | 379/230 |
| 5,974,126 | * | 10/1999 | Hollas et al. ...................... | 379/137 |

FOREIGN PATENT DOCUMENTS

| | | |
|---|---|---|
| 4413960 | 10/1995 | (DE) . |
| 19513472 | 10/1996 | (DE) . |
| 9512291 | 5/1995 | (WO) . |

OTHER PUBLICATIONS

CCITT Recommendation E.412, ppl. 21–29, "Network Management Controls".

"Advanced Traffic Control Methods for Network Management" K. Mase et al, 2460 IEEE Communications Magazine 28 (1990) Oct. No. 10, New York, pp. 82–88.

* cited by examiner

Primary Examiner—Ahmad Matar
Assistant Examiner—William J. Deane, Jr.

(57) ABSTRACT

Measurements are performed for detecting a mass calling to a subscriber (T) in a telecommunications network (KN), for controlling the establishment of connections to the subscriber (T) who is the destination of the mass calling. If a connection is blocked as a busy connection due to a detected mass calling, information announcing the establishment of the busy connection to the involved exchanges (B3, B, M, M2 and BM22) is added to a back-signalling message to release the connection which is busy because of the mass calling.

5 Claims, 2 Drawing Sheets

METHOD, EXCHANGE AND TELECOMMUNICATIONS NETWORK FOR CONTROLLING THE ESTABLISHMENT OF CONNECTIONS TO A SUBSCRIBER WHO IS THE DESTINATION OF MASS CALLING

BACKGROUND OF THE INVENTION

1. Technical Field

The present invention concerns a method, an exchange and a telecommunications network for controlling the establishment of connections to a subscriber who is the destination of a mass calling.

2. Discussion of Related Art

Mass callings to a telecommunications network subscriber, for example prompted by radio and television surveys or contests, can lead to instabilities, bottlenecks or blockages within the telecommunications network. Many short-time calls take place within a limited time interval in the exchanges of the telecommunications network, which displace more economical normal calls. If the operator of the telecommunications network has previously been advised of such actions, he can use choking means, for example call gapping or leaky bucket per CCITT recommendation E.412, to reduce or prevent bottlenecks and blockages within the telecommunications network.

SUMMARY OF INVENTION

It is the task of the following invention to reduce or prevent instabilities, bottlenecks or blockages within a telecommunications network which are caused by mass callings to subscribers.

According to a first aspect of the invention, a method of controlling the establishment of connections to a subscriber who is the destination of mass calling in a telecommunications network with exchanges, comprises a detection of a mass-calling situation is carried out in exchanges, wherein the occurrence of the mass calling to said subscriber is detected, and wherein a back-signaling message for releasing a busy connection to said subscriber contains information which indicates the occurrence of the mass calling to the exchanges involved in the establishment of the busy connection.

According to a second aspect of the invention, an exchange for controlling the establishment of connections to a subscriber who is the destination of mass calling in a telecommunications network with exchanges comprises a first means for detecting a mass-calling situation and a second means for generating a back-signaling message for releasing a busy connection to said subscriber, said back-signaling message, if the first means detects the mass-calling situation, containing information which indicates the occurrence of the mass-calling situation to the exchanges involved in the establishment of the busy connection.

According to a third aspect of the invention, an exchange for controlling the establishment of connections to a subscriber who is the destination of mass calling in a telecommunications network with exchanges comprises a receiving means for receiving a back-signaling message for releasing a busy connection to said subscriber, said back-signaling message containing information which indicates the occurrence of the mass-calling situation, and a choking means for limiting the traffic toward the destination of the mass calling in response to the reception of said information.

According to a fourth aspect of the invention, a telecommunications network for controlling the establishment of connections to a subscriber who is the destination of mass calling comprises an exchange according to the second aspect of the invention and an exchange according to the third aspect of the invention.

An advantage of the present invention is that the control of the establishment of connections in the case of the occurrence of a mass calling to the subscriber takes place automatically. Furthermore, no special signalling messages need to be transmitted to other exchanges of the telecommunications network to limit the traffic to the subscriber who is the destination of the mass calling.

In an advantageous configuration of the invention, information is signalled to an exchange involved in the establishment of the busy connection so that this exchange can limit the traffic toward the destination of the mass calling to a throughput rate which is dependent on the information.

BRIEF DESCRIPTION OF THE DRAWING

Configuration examples are described in the following by means of the drawing to clarify the a invention and its advantages, wherein.

DETAILED DESCRIPTION OF PREFERRED EMBODIMENTS

Figure 1:
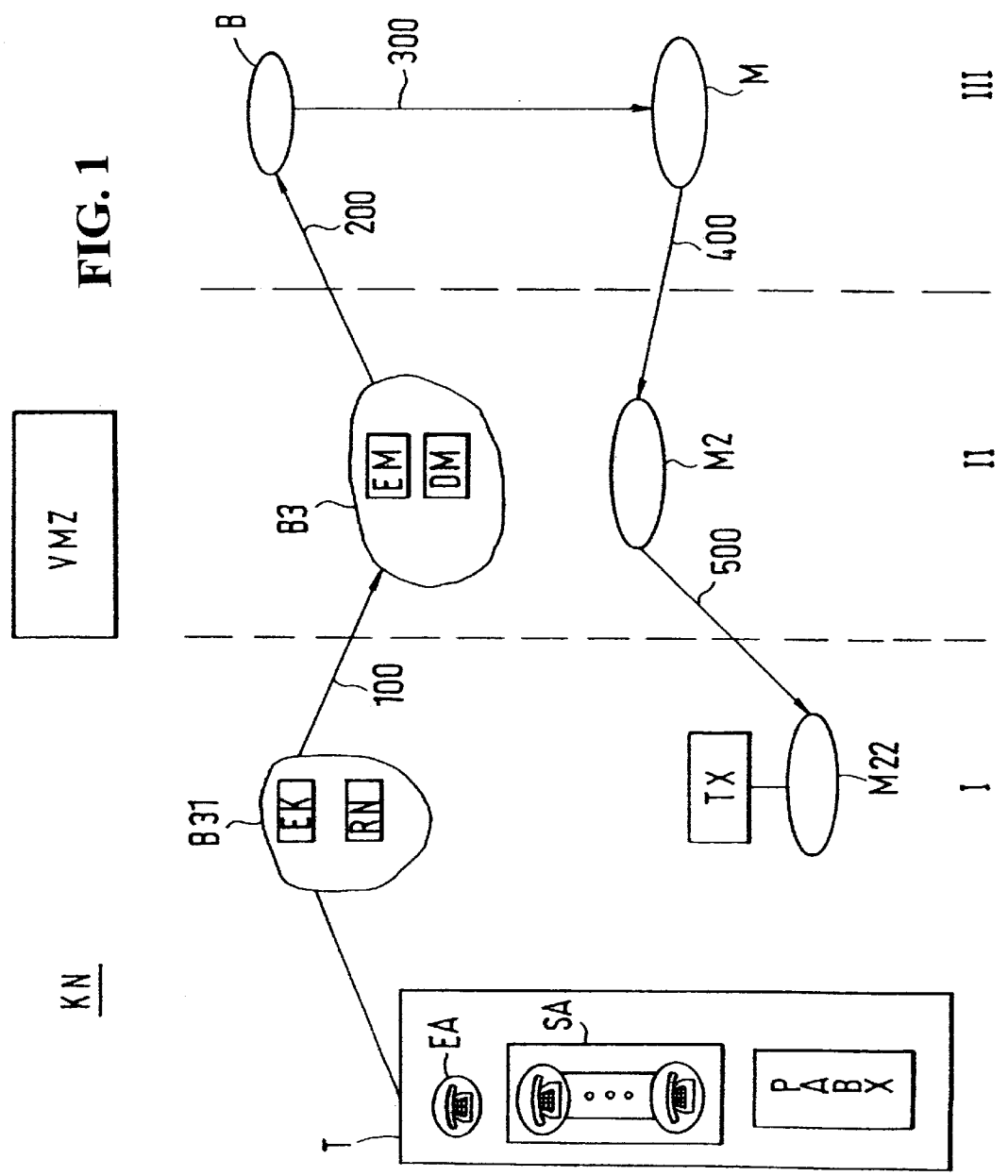
FIG. 1 is a configuration example of a telecommunications network of the invention with an exchange of the invention.

A configuration example illustrated in FIG. 1 is a telecommunications network KN for controlling mass callings to subscribers of the telecommunications network KN. Mass calling means that a large number of connections are established simultaneously to a subscriber. This number of connections being established, which characterizes a mass calling, depends on the number of lines per subscriber station. The effect of the mass calling on the telecommunications network depends on the origin of the mass calling and the structure of the telecommunications network. Mass calling to the subscriber creates instabilities, bottlenecks or blockages in the telecommunications network, thereby displacing the normal traffic.

In the present configuration example the telecommunications network KN is divided into a supply area I, a regional area II and a long-distance area III. Although this division is normal for existing and future telecommunications networks, it is not required to carry out the invention. A number of exchanges are arranged in these three areas. In the present FIG. 1, the exchanges B31 and M22 are representative for the supply area I. A number of subscribers are connected to each of these exchanges of which one subscriber T is illustrated in the present configuration example as representative and is connected to exchange B31, and one subscriber TX is connected to exchange M22. As illustrated in FIG. 1, the subscriber T may be a private branch exchange PABX, a collective line SA or a subscriber station EA which is switched as a main station line. In the present configuration example two exchanges B3 and M2 are representative for the regional area II. Further subscribers who are not illustrated in FIG. 1 may be connected to these exchanges B3 and M2. In the present configuration example two exchanges B and M are also illustrated as representative for the long-distance area III. In the present configuration example no subscribers are connected to exchanges B and M. The telecommunications network KN furthermore contains a central control facility VMZ. Exchanges B31, B3, B, M, M2 and M22 are interconnected by not illustrated connection lines. The exchanges of the telecommunications network KN may contain a first means to detect the occurrence of a mass calling. The first means EK of exchange B31 is illustrated as representative for FIG. 1. Such a first means need not necessarily be present in every exchange of the telecommunications network KN. In a particularly advantageous configuration such a first means is located in those exchanges of the telecommunications network KN to which subscribers who may be possible destinations of a mass calling are connected. The exchanges of the telecommunications network KN may also contain a second means for generating a back-signalling message for releasing a connection. A second means RN of exchange B31 is illustrated as representative for the present configuration example in FIG. 1.

The exchanges of the telecommunications network KN may furthermore contain a receiving means to receive a back-signalling message for releasing a busy connection to said subscriber (T), where this back-signalling to message contains information indicating the occurrence of the mass calling. In addition to that it may contain a choking means for limiting the traffic toward the destination (T) of the mass calling in response to the reception of said information. The receiving means EM and the choking means DM of exchange B3 are illustrated as representative in FIG. 1.

In the present configuration example the exchanges of the telecommunications network KN transmit information to the central control facility VMZ which is provided for acquisition and evaluation and particularly for statistical purposes. In the present case such information especially indicates a mass calling to a subscriber. The central control facility VMZ is advantageous for carrying out the present invention, but is not required. It is possible to perform the control within the telecommunications network KN exclusively by means of a signal between the individual exchanges of the telecommunications network KN, thereby omitting the central control facility VMZ. But it is also possible to perform the control of the telecommunications network KN exclusively via the central control facility VMZ.

In the present configuration example, by means of the first means EK the exchange B31 detects a mass calling to the subscriber station EA connected as a main station line of subscriber T, who is connected to the exchange B31. In that case a connection request from subscriber TX to subscriber T was blocked by exchange B31, since the line of subscriber T who is connected to exchange B31 is busy. The busy connection from subscriber TX to subscriber T was established in the telecommunications network KN via exchanges M22, M2, M, B, B3 and B31. The busy connection is subsequently released starting with exchange B31. To that end the second means RN of exchange B31 generates a back-signalling message which is transmitted in the opposite direction of that of the original connection to exchange M22. Since a mass calling to the subscriber T was detected in the present case by the first means EK, a first information in the form of a parameter is added to said back-signalling message for releasing the busy connection to subscriber T, which indicates the basic mass calling for blocking the requested connection from subscriber TX to subscriber T. This back-signalling message with the parameter for blocking the mass calling is transmitted in a step 100 from exchange B31 to exchange B3, in a step 200 from said exchange B3 to exchange B, in a step 300 from exchange B to exchange M, in a step 400 from this exchange M to exchange M2, and in a step 500 from this exchange M2 to the original exchange M22 to which the subscriber TX is connected. Every one of exchanges M22, M2, B, B3, B31 involved in the original establishment of the busy connection from subscriber TX to subscriber T receives this first information via its receiving means and thus receives the information that a mass calling to subscriber T exists. The existence of the mass calling is also signalled to the central facility VMZ by exchange B31.

The exchanges involved in the establishment of the busy connection are now in a position to take suitable measures against the occurrence of the mass calling, by limiting the traffic toward the destination of the mass calling via the respective choking means. This enables an operator of the telecommunications network KN to decide whether or not an exchange which is involved in the establishment of the busy connection utilizes the information about the occurrence of the mass calling to limit the traffic toward the destination of the mass calling. In that case limit means that the respective exchange reduces the traffic conducted via it to the subscriber. In the present configuration example the traffic to the subscriber is restricted to a predetermined number of calls switched further per time, i.e. the specified throughput rate. Calls that are not switched further are rejected by the exchange. The calling subscriber stations receive a busy signal. Known choking means such as leaky bucket or call gapping are used to limit the traffic.

It is advantageously possible to also transmit a second information together with the back-signalling message to the exchanges involved in the establishment of the busy connection, whereby the respective switching center determines the throughput rate of the traffic toward the destination of the mass calling. This second information can be for example the number of connection lines whereby the subscriber T, who is the destination of a mass calling, is connected to the exchange B31. It could be determined for example that for each connection line a request for traffic to the destination of the mass calling is routed further by the respective exchange toward the destination of the mass calling. However it is also possible that the respective throughput rate is already fully implemented by the respective exchange, or that it is signalled for example to the respective exchange by the central control facility VMZ.

Figure 2:
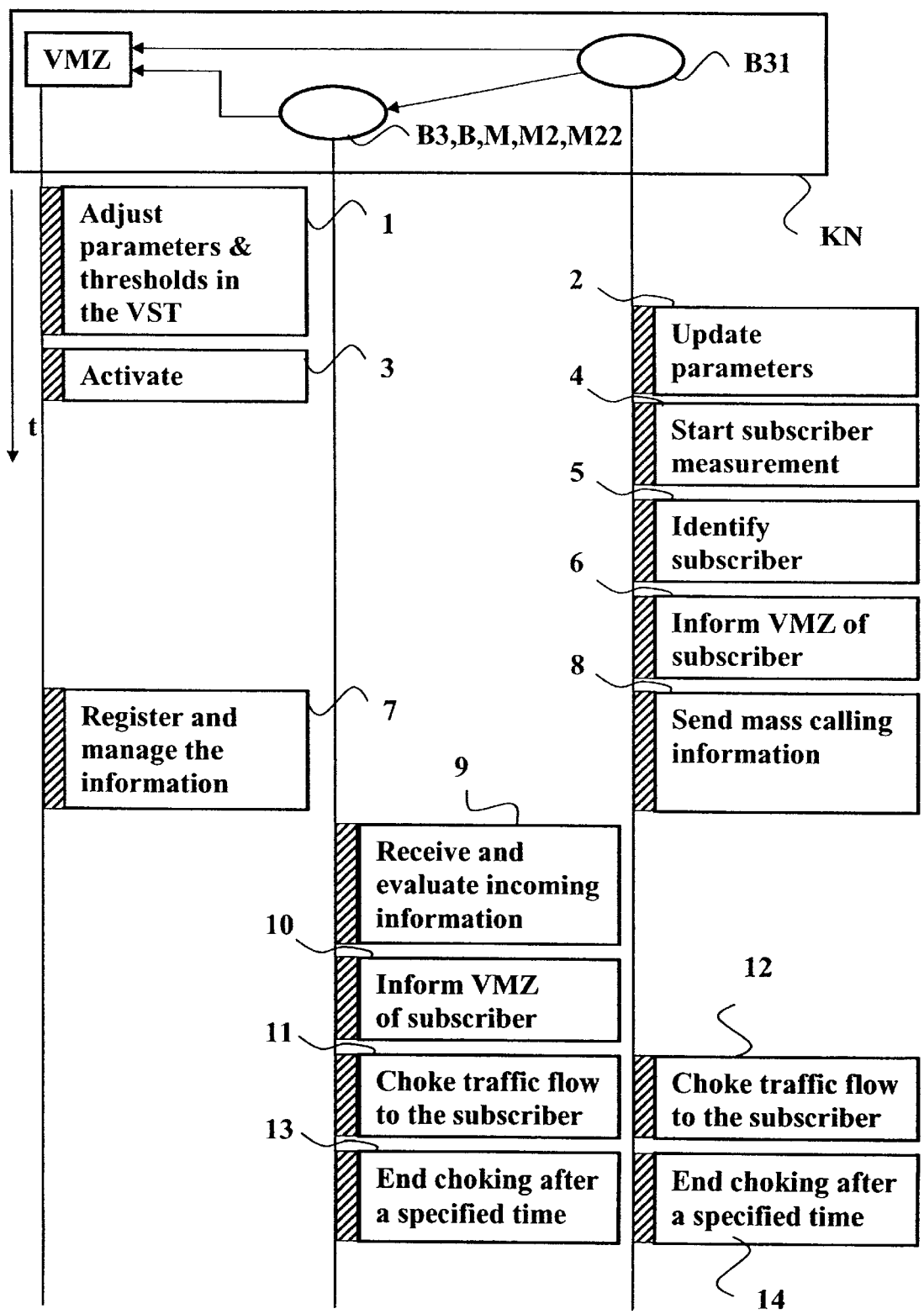
FIG. 2 is a flow chart of a configuration example of a method according to the invention.

The following describes the operating mode of the telecommunications network KN for controlling an establishment of connections to the subscriber T who is the destination of the mass calling. To that end FIG. 2 is a flow chart of a configuration example of the method of the invention to be carried out in the telecommunications network KN. The method steps to be carried out are arranged in FIG. 2 in accordance with the place where they are performed, thus the exchange B31 which detects the mass calling, and in addition to the exchanges involved in the establishment of the busy connection M22, M2, B and B3 and the central control facility VMZ.

In a step 1, for example by means of a service terminal connected to the central control facility VMZ, an adjustment of parameters describing the characteristics of the method of the invention is entered and transmitted to the exchanges of the telecommunications network KN. The particular parameters for the present configuration example of the method of the invention are a subscriber threshold value for determining the destination of the mass calling, and the choking rates for the exchanges of the telecommunications network KN, which are entered so that in the event of an occurrence of a mass calling the respective exchange can limit the traffic conducted via it to the concerned subscriber who is the destination of the mass calling.

In a step 2, the parameters entered in step 1 are updated by the respective exchanges. Then in a step 3, starting with the central control facility VMZ, the detection of the mass calling is activated for the telecommunications network KN. Subsequently in a step 4 the exchanges start a subscriber measurement to determine the subscriber who is the destination of the mass calling. This subscriber measurement takes place for example within a time cycle of ten seconds. In a step 5, the subscriber who is the destination of the mass calling is identified. To that end a subscriber value is determined, which is the result of the quotients of the number of calls successfully switched to the subscriber and the number of attempted calls to this subscriber received by the exchange B31. The attempted calls comprise both successful and unsuccessful calls to this subscriber received by the respective exchange. In this way a respective subscriber value is determined for all the subscribers, which is subsequently compared with the subscriber threshold value transmitted to the exchanges in step 1. If the subscriber value falls below the subscriber threshold value, the mass calling to this subscriber is detected. If several subscribers are detected as the destinations of mass callings, the subscriber with the lowest threshold value is determined to be the most important. It is possible for the method of determining the subscriber who is the destination of the mass calling to be carried out in a different manner.

In a step 6 the subscriber detected in step 5, who is the destination of the mass calling, is registered in a list of exchanges and is transmitted to the central control facility VMZ together with other information concerning this mass calling. Such other information concerning the mass calling can be for example an indication of the exchange that determined the subscriber who is the destination of the mass calling, an indication of the call number of the determined subscriber and the throughput rate to which the traffic to the subscriber who is the destination of the mass calling is restricted. In a step 7, the central control facility VMZ receives the information concerning the mass calling which was transmitted to it, and stores it in a memory for further evaluation.

In a step 8, the exchange B31 which detects the mass calling generates the back-signalling message to release the busy connection of subscriber TX by using its second means RN. In that case the first information announcing the occurrence of the mass calling is added to this back-signalling message. After that the back-signalling message is transmitted to the exchanges B3, B, M, M2 and M22 that are involved in the establishment of the busy connection, in the opposite direction to that of the establishment of the connection, to inform them of the occurrence of the mass calling.

In a step 9, the exchanges B3, B, M, M2 and M22 receive the transmitted information concerning the detected mass calling, store it and evaluate it to determine choking parameters in particular, as already described earlier. In a step 10, the exchanges involved in the establishment of the busy connection transmit information about subscriber T who is the destination of the mass calling, plus their respective throughput rate to the central control facility VMZ. In a step 11, the exchanges begin to limit the traffic conducted via them to the subscriber who is the destination of the mass calling, to the throughput rate established for the respective exchange. In a step 12, the same is carried out by the exchange B31 which detects the mass calling. The throughput rate can be established individually for each exchange of the telecommunications network KN.

On the basis of the transmitted information the central control facility VMZ can perform an evaluation of the detected mass calling. When necessary there is the possibility for the central control facility VMZ to make a change in the choking of the traffic caused by the exchanges to the subscriber who is the destination of the mass calling. It is also possible that a comparison performed in the central control facility VMZ between the momentary mass calling situation and similar mass calling situations known from past experience, can lead to a correction proposal on the part of the central control facility VMZ for controlling the mass calling. These proposed changes to control the mass calling are signalled by the central control facility VMZ to the exchanges of the telecommunications network KN involved in the establishment of the busy connection, which then convert these proposals directly. The effects of the changes made to control the mass calling are announced by the involved exchanges to the central control facility VMZ, which then also evaluates these effects and possibly corrects them again. This described potential request of changes to control the mass calling is not required to carry out the invention, but it is advantageous because it makes a more effective control of the mass calling possible.

In steps 13 and 14, the choking of traffic conducted by the respective exchanges to the subscriber, who is the destination of the mass calling, is terminated after a predetermined time, e.g. 30 minutes. This predetermined time to end the traffic choking is variable. In this way a potential continuous activation and deactivation of the traffic choking in the exchanges is avoided.

What is claimed is:

1. A method of controlling the establishment of connections to a subscriber (T) who is the destination of mass calling in a telecommunications network (KN) with exchanges (B31, B3, B, M, M2, M22), wherein a detection of a mass-calling situation is carried out in at least one of said exchanges (B31), wherein the occurrence of the mass calling to said subscriber (T) is detected, and wherein a back-signalling message for releasing a busy connection to said subscriber (T) contains information which indicates the occurrence of the mass calling to the exchanges (B3, B, M. M2, M22) involved in the establishment of the busy connection and contains information stating the number of lines by which said subscriber (T) is connected to said first exchange (B31).

2. A method as claimed in claim 1, characterized in that further information is signaled to at least one of the exchanges (B3, B, M, M2, M22) involved in the establishment of the busy connection, so that said at least one of the exchanges (B3, B, M, M2, M22) will limit the traffic toward the destination (T) of the mass calling to a call rate dependent on said further information.

3. An exchange (B31) for controlling the establishment of connections to a subscriber (T) who is the destination of mass calling in a telecommunications network (KN) with exchanges (B31, B3, B, M, M2, M22), said exchange (B31) comprising:

a first means (EK) located at the first exchange (B31) for detecting a mass-calling situation to said subscriber (T); and a second means (RN) located at the first exchange (B31) for generating a back-signalling message for releasing a busy connection to said subscriber (T), said back-signalling message, if the first means (EK) detects the mass-calling situation, containing information which indicates the occurrence of the mass-calling situation to the exchanges (B3, B, M, M2, M22) involved in the establishment of a busy connection, said information usable by the exchanges for call limiting purposes in the exchanges and said information containing information stating the number of lines by which said subscriber (T) is connected to one of the exchanges (B31).

4. An exchange (B3) for controlling the establishment of connections to a subscriber (T) who is the destination of mass calling in a telecommunications network (KN) with exchanges (B31, B3, B, M, M2, M22), said exchange (B3) comprising:

a receiving means (EM) for receiving a back-signalling message from a first exchange (B31) for releasing a busy connection to said subscriber (T), said back-signalling message containing information which indicates the occurrence of the mass-calling situation and containing information stating the number of lines by which said subscriber (T) is connected to said first exchange (B31); and a choking means (DM) for limiting traffic toward the destination (T) of the mass calling in response to the reception of said information.

5. A telecommunications network (KN) for controlling the establishment of connections to a subscriber (T) who is the destination of mass calling, comprising a first exchange (B31) and a second exchange (B3) wherein the first exchange comprises:

a first means (EK) located at the first exchange (B31) for detecting a mass-calling situation to said subscriber (T); and a second means (RN) located at the first exchange (B31) for generating a back-signalling message for releasing a busy connection to said subscriber (T), said back-signalling message, if the first means (EK) detects the mass-calling situation, containing information which indicates the occurrence of the mass-calling situation to the exchanges (B3, B, M, M2, M22) involved in the establishment of a busy connection, and wherein the second exchange comprises:

a receiving means (EM) for receiving a back-signalling message from the first exchange (B31) for releasing the busy connection to said subscriber (T), said back-signalling message containing information which indicates the occurrence of the mass-calling situation and containing information stating the number of lines by which said subscriber (T) is connected to said first exchange (B31); and a choking means (DM) for limiting traffic toward the destination (T) of the mass calling in response to the reception of said information.

\* \* \* \* \*

UNITED STATES PATENT AND TRADEMARK OFFICE
CERTIFICATE OF CORRECTION

PATENT NO.    : 6,310,950 B1
DATED         : October 30, 2001
INVENTOR(S)   : Kurt Spildener et al.

It is certified that error appears in the above-identified patent and that said Letters Patent is hereby corrected as shown below:

<u>Title page,</u>
Item [56] References Cited cancel "5,852,064" and substitute -- 5,832,064 -- therefor.
Item [57] ABSTRACT at line 8, cancel "BM22" and substitute -- M22 -- therefor.

Signed and Sealed this

Twenty-eighth Day of May, 2002

*Attest:*

JAMES E. ROGAN
*Director of the United States Patent and Trademark Office*

*Attesting Officer*